United States Patent [19]
Haase

[11] Patent Number: 6,066,349
[45] Date of Patent: May 23, 2000

[54] APPLICATION OF MAGNESIUM OXIDE AND MAGNESIUM HYDROXIDE AS PRESERVATIVES

[76] Inventor: Richard Alan Haase, P.O. Box 623, Sugarland, Tex. 77487-0623

[21] Appl. No.: 08/946,707

[22] Filed: Oct. 8, 1997

[51] Int. Cl.[7] ....................................................... A23B 4/02
[52] U.S. Cl. ........................ 426/331; 426/335; 426/541; 426/641; 426/807
[58] Field of Search .................................. 426/331, 335, 426/541, 641, 807

[56] References Cited

U.S. PATENT DOCUMENTS

| | | | |
|---|---|---|---|
| 3,875,313 | 4/1975 | Brotsky | 426/265 |
| 4,207,344 | 6/1980 | Cerrillo | 426/7 |
| 4,416,909 | 11/1983 | Aversano | 426/265 |
| 4,443,484 | 4/1984 | Dahlstrom | 426/266 |
| 4,961,945 | 10/1990 | Pearson | 426/269 |
| 5,409,725 | 4/1995 | Connolly | 426/599 |
| 5,543,169 | 8/1996 | Colarow et al. | 426/662 |
| 5,568,895 | 10/1996 | Webb et al. | 241/16 |

FOREIGN PATENT DOCUMENTS 303477  8/1987  European Pat. Off. .

*Primary Examiner*—Helen Pratt
*Attorney, Agent, or Firm*—Maryam Bani-Jamali; Butler & Binion, L.L.P.

[57] ABSTRACT

The present invention provides a chemical product having magnesium oxide, magnesium hydroxide or both and being applied as a preservative for animal or animal parts containing fats, proteins or both. The animal or animal part are meat, meat by-product, blood, blood products and animal feed. The preservative may also be combined with an anti-oxidant (such as Vitamin E, i.e. Tocopheryl Acetate), sodium hydroxide, potassium hydroxide, calcium hydroxide, calcium oxide or sodium bicarbonate. The preservative is used as a neutralizer of acids in degradation reactions of proteins and as a neutralizer of acids in degradation reactions of fats. The method of application of the preservative for neutralizing acids during degradation reactions of proteins and for neutralizing acids during degradation reactions of fats is also presented. By stabilizing pH of acidic media, degradation reactions of fats and proteins are slowed.

14 Claims, No Drawings

APPLICATION OF MAGNESIUM OXIDE AND MAGNESIUM HYDROXIDE AS PRESERVATIVES

BACKGROUND OF THE INVENTION

1. Field of the Invention

In order to neutralize acids during degradation reactions of proteins and during degradation reactions of fats, a chemical product having magnesium oxide, magnesium hydroxide or both is applied as a preservative to animal or animal part containing fats, proteins or both.

2. Description of the Prior Art

A significant portion of proteins of animal or animal part consists of various forms of amino acids. (Please note that animal part is selected from the group consisting of "meat, meat by-product, blood, blood product and animal feed". The phrase "animal part" also serves as a general term representing any number of cells of an animal. In addition, please note that the phrase "animal feed" refers to "animal or animal part that contains proteins and/or fats and that serves as feed for carnivorous animal".) A portion of fats of animal or animal part (selected from the group consisting of meat, meat by-product and animal feed) consists of fatty acids. Although amino acids are essential to the building of DNA and RNA, when amino acids are released into animal or animal part containing proteins (selected from the group consisting of meat, meat by-product, blood, blood product and animal feed), the pH of animal or animal part containing proteins is decreased by acidification. Similarly, when fatty acids are released into animal or animal part containing fats (selected from the group consisting of meat, meat by-product and animal feed), the pH of animal or animal part containing fats is decreased by acidification.

In most cases, degradation of proteins begins by oxidation of proteins releasing amino acids. Similarly, degradation of fats begins by oxidation of fats releasing fatty acids. To delay degradation of proteins, oxidation of proteins should be avoided. Similarly, to delay degradation of fats, oxidation of fats should be avoided. In recent years, to inhibit oxidation of fats and proteins, anti-oxidants have been added to animal or animal part containing fats and proteins. Tests have been run on meat and meat by-product. Vitamin E (Tocopheryl Acetate) has been shown to inhibit oxidation of fats and proteins in meat and meat by-product. Degradation of animal or animal part containing fats and/or proteins (selected from the group consisting of meat, meat by-product and animal feed) is accelerated by acidification of fats and/or proteins contained therein. Upon undergoing acidification, animal or animal part containing fats and/or proteins is further degraded to fats and proteins (F&P). Reduced amino acids of proteins of animal or animal part is further reduced to ammonia and sulfides. As proteins degrade to acidified amino acids, the pH of proteins drops, increasing degradation of proteins and associated production of amino acids, sulfides and ammonia.

Sulfides produce sulfuric acid which furthers degradation of proteins of animal or animal part (with meat, meat by-product or animal feed commonly referred to as "rancid meat", "rancid meat by-product" or "rancid animal feed", respectively). Rancid meat is acidic. Rancid meat by-product (as well as other rancid protein by-product, including "rancid blood" and "rancid blood product"), not only have a value which is significantly less than high quality recycled proteins, but also pose a significantly noteworthy safety issue and equipment costing issue. It is well known that rancid blood and proteins contain a significant amount of sulfides. Therefore, blood-carrying carrying vessels, such as empty blood trucks, contain lethal amounts of hydrogen sulfide, as well as ammonia. When processed for animal consumption, rancid animal feed are corrosive to processing equipment. Recycled animal part containing protein becomes toxic with ammonia, acids, acid salts and sulfides and loses its value in entirety when significant levels of ammonia and sulfides intoxication is reached.

In the past, the food and beverage industries have attempted unsuccessfully to find a solution to the above issues. By using various stabilizers, methods have been developed to delay fat and protein degradation and stabilize fats and proteins in acidic media. However, the association between stabilizers and fats and proteins in many such suspensions is merely mechanical in nature. As a result, the fats and proteins precipitate out of the acidic medium over relatively short periods of time when subjected to conventional storage conditions for such compositions. In addition, these suspensions demonstrate this temporary stability only within a narrow acidic pH range.

The concept of treating fatty and/or proteic foodstuffs with a preservative is not new and is of course not per se claimed to be novel. Some patents that have been issued in an attempt to provide compositions and methods for preserving fats and proteins follow. However, such patents are limited in their scope of protection and coverage. For example, Colarow et al., U.S. Pat. No. 5,543,169, issued on Aug. 6, 1996, patent a lysolecithin/polymer composition, that when added to food product containing proteins, causes stabilization of the proteins to heat.

Connolly, U.S. Pat. No. 5,409,725, issued on Apr. 25, 1995, patents methods for stabilizing proteins in an acid pH environment. In particular, a chemical reaction between proteins and galactomanman to achieve protein stability in acid pH media is promoted.

Pearson, U.S. Pat. No. 4,961,945, issued on Oct. 9, 1990, patents a food preservative composition comprising alum and citric acid.

Dahlstrom, U.S. Pat. No. 4,443,484, issued on Apr. 17, 1984, patents a method for preservation of meat product by incorporating in meat product 3-(4-tolysulfonyl) acrylonitrile, together with an alkali metal nitrite salt.

Aversano, U.S. Pat. No. 4,416,909, issued on Nov. 22, 1983, patents a method of treatment of meat by using a meat preservative with a composition comprising between about 10% to 40% of each of the following constituents: (1) ascorbic acid and/or the sodium or potassium salts thereof; (2) citric acid and/or the sodium or potassium salts thereof; (3) sodium or potassium carbonate; and (4) sulfite, bisulfite or metabisulfite of sodium or potassium.

Cerrillo, U.S. Pat. No. 4,207,344, issued on Jun. 10, 1980, patents processes for protecting proteic foodstuff against spoilage. The foodstuff is immersed in a stabilizer composed of a buffer solution, a proteolytic enzyme and an antioxidant. The foodstuff can, then, be reconstituted by rapidly reversing its pH by immersion in a hypotonic solution to kill bacteria present in the foodstuff, immersing it in a hypertonic solution to eliminate the hypotonic solution and, finally, rehydrating the foodstuff.

Brotsky, U.S. Pat. No. 3,875,313, issued on Apr. 1, 1975, patents a method of treating meat by a meat-treating composition comprising anhydrous sodium tripolyphosphate hexahydrate wherein water of hydration contains lemon juice solids.

The above-listed patents and many other similar inventions have been developed, some of which still exist in the market. Although many different issues have been solved by application of previously- and presently-existing preservatives of animal or animal part, there still remains room for improvement in the area of preservation of animal or animal part. There remains a need for improved chemical products and methods for application of said chemical products to increase the shelf-life of animal or animal part (selected from the group consisting of meat, meat by-product, blood, blood product and animal feed) containing fats, proteins or both.

By stabilizing their pH, the value and shelf-life of animal or animal part containing fats, proteins or both can be increased significantly. The preservative presented in this invention has the ability to stabilize the pH of animal or animal part containing fats, proteins or both and, thereby, stabilize degradation reactions of fats and proteins.

SUMMARY OF THE INVENTION

A primary object of the invention is to devise a simple, relatively inexpensive, effective, efficient and safe preservative for animal or animal part containing fats, proteins or both.

An additional object of the invention is to devise an easily accessible preservative for animal or animal part containing fats, proteins or both that is directly available on the market without having to carry out an enzymatic treatment.

Another object of this invention is to devise a method for stabilizing animal or animal part containing fats, proteins or both that exhibits relatively long-term stability and increased shelf-life.

Still another object of this invention is to devise a method for stabilizing animal or animal part containing fats, proteins or both that exhibits maximal pH control and stability.

A final object of this invention is to provide a method for neutralizing acids in proteins in animal or animal part containing proteins and/or for neutralizing acids in animal or animal part containing fats and, as a result, stabilizing degradation reactions of fats and proteins.

Additional objects and advantages of the invention will be set forth in part in a detailed description which follows, and in part will be obvious from the description, or may be learned by practice of the invention.

The present invention provides a chemical product having magnesium oxide, magnesium hydroxide or both and being applied as a preservative for animal or animal part containing fats, proteins or both. Animal or animal part is selected from the group consisting of meat, meat by-product, blood, blood product and animal feed. The preservative may also be combined with an anti-oxidant (such as Vitamin E, i.e. Tocopheryl Acetate), sodium hydroxide, potassium hydroxide, calcium hydroxide, calcium oxide or sodium bicarbonate. The preservative is used as a neutralizer of acids in degradation reactions of proteins and as a neutralizer of acids in degradation reactions of fats. The preservative typically appears in a fine brown granular-powder form.

The method of application of the preservative for neutralizing acids during degradation reactions of proteins and for neutralizing acids during degradation reactions of fats is also presented. By stabilizing pH of acidic media, degradation reactions of fats and proteins are slowed. Relatively long-term stability of fats and proteins in the acidic media is achieved by promoting chemical reactions between magnesium oxide (in the preservative) and water. Upon contact with water, magnesium oxide hydrolyzes to magnesium hydroxide and, as a result, hydroxyl groups are formed. Hydroxyl groups are applied to neutralize acids existing in proteins and to neutralize acids existing in fats. Therefore, a longer amount of time is required before animal or animal part containing fats, proteins or both turns rancid. If the preservative is combined with an anti-oxidant, an even longer amount of time is required before animal or animal part turns rancid.

It is to be understood that the descriptions of this invention are exemplary and explanatory, but are not restrictive, of the invention. Other objects and advantages of this invention will become apparent from the following specification and from any accompanying charts, tables and examples.

DETAILED DESCRIPTION OF THE PREFERRED EMBODIMENT

Preferred embodiments of the present invention are illustrated in any charts, tables and examples that are included.

The present invention provides a chemical product having magnesium oxide (MgO), magnesium hydroxide (Mg(OH)$_2$) or both and being applied as a preservative for animal or animal part containing fats, proteins or both. Magnesium oxide hydrolyzes to magnesium hydroxide upon contact with water. (Please note that animal and animal part is selected from the group consisting of meat, meat by-product, blood, blood product and animal feed that originates from animal corpse). The method of application of the preservative for neutralizing acids (including amino acids) during degradation reactions of proteins and for neutralizing acids (including fatty acids) during degradation reactions of fats is also presented.

The preservative significantly improves the shelf-life of fats and proteins. The preservative of the present invention effectively and efficiently buffers animal or animal part containing fats, proteins or both from acid degradation reactions that cause rancidity. Presently and in the past, pH stabilizers have existed and been used in many forms. Among various pH stabilizers that have been used for different purposes are sodium hydroxide, potassium hydroxide, calcium oxide, calcium hydroxide and sodium bicarbonate. Most pH stabilizers, among pH stabilizers that have been reviewed, are not self-buffering. Sodium hydroxide has a very strong ability to neutralize acids, but is not self-buffering. Addition of sodium hydroxide to a system results in a logarithmic increase in the hydroxide ion concentration while causing an increase in pH of the system. In the case of recycled proteins, stabilization of acid degradation reactions for as little as 12 hours requires an amount of sodium hydroxide that will oxidize the proteins thereby increasing degradation reactions. Unfortunately, the pH stabilizers that have been determined to be self-buffering, do not have a very strong ability to neutralize acids. Although calcium oxide and calcium hydroxide are self-buffering at a certain pH level, they are limited in their ability to neutralize acids. Sodium bicarbonate which, although is self-buffering to a pH near 8.5, is limited in its ability to neutralize acids.

The uniqueness of magnesium oxide to neutralize pH and to provide a high pH buffer lends to a unique solution for rancid animal or animal part formation. Upon coming into contact with water, magnesium oxide immediately hydrolyzes to form magnesium hydroxide. However, in contrast to sodium and potassium, magnesium oxide forms two (versus one) hydroxyl groups (Mg(OH)$_2$ vs. NaOH and KOH) in an aqueous environment. Therefore, on a molar basis, magnesium oxide is two times more efficient to neutralize acids than is sodium hydroxide or potassium hydroxide. Sodium hydroxide and potassium hydroxide have the ability to neutralize acids and increase the pH. However, sodium hydroxide and potassium hydroxide are so strong that they oxidize proteins, as well as fats, during a short term increase of the pH before a rapid decrease in pH occurs due to subsequent acidification of the proteins. High concentrations of sodium hydroxide or potassium hydroxide will have a pH at or near 14. Hydroxide ion concentrations available at a pH above 10 will oxidize most organic materials, especially proteins and fats. As a point of reference, many biocides are strong oxidizers. Due to the limited solubility of calcium in water, magnesium oxide is many times more effective than calcium oxide or calcium hydroxide. Magnesium oxide is much more effective than sodium bicarbonate as well.

Therefore, the preservative has provided unique solutions for rancid animal or animal part formation that had not been previously offered by sodium hydroxide, potassium hydroxide, calcium oxide, calcium hydroxide, sodium bicarbonate or anti-oxidant. Yet, it should not be ignored that when the preservative is combined with sodium hydroxide, potassium hydroxide, calcium oxide, calcium hydroxide, sodium bicarbonate or anti-oxidant, the rate of formation of hydroxyl groups is even higher and, thus, an even longer amount of time is required before animal or animal part turns rancid. For example, the preservative may be used in combination with Vitamin E, as an anti-oxidant, to improve results obtained by an individual application of either the preservative or Vitamin E for inhibiting oxidation of proteins in animal or animal part containing proteins. Magnesium hydroxide is self-buffering at a pH of 9.5 to 10.0, while having a significant capability to neutralize acids. A slurry of magnesium hydroxide will not have a pH over 10. At a pH of about 10, magnesium hydroxide precipitates out of solution, eliminating further increases in pH. The self-buffering capability of magnesium oxide keeps the pH stable both during oxidation and acidification.

The preservative typically appears in a fine brown granular-powder form and has a density of about 65 lb/ft$^3$. Although the preservative comprises a number of chemical products in a preferred embodiment, magnesium oxide forms a major portion of the preservative. In a preferred embodiment, magnesium oxide makes up over about 90% of the preservative.

The chemical analysis of a preferred embodiment of the preservative is as follows:

| Typical Chemical Analysis | % |
|---|---|
| MgO | 93.00 |
| $R_5O_3$* | 1.50 |
| CaO | 2.50 |
| Insol | 3.00 |

*Calcium and magnesium silicates, alumninates and ferrites

Although the preservative reacts with strong acids, as well as with other electron acceptors, the preservative is relatively stable when dry and has a shelf-life of about 3 years. The preservative may be stored in glass-, stainless steel-, steel-, polyethylene-, polypropylene-, polyvinylchloride- or epoxy-lined tanks, but must not be stored in aluminum, copper, iron or brass systems to which the preservative is moderately corrosive.

The preservative, when added to animal or animal part (e.g. blood and meat by-product) in concentrations ranging from approximately 500 ppm to approximately 5000 ppm, has shown a significant ability to hold the pH of animal or animal part at or above approximately 6.0 for extended periods of time, as well as to hold acid, sulfide and ammonia production in animal or animal part by stabilizing degradation of reactions of proteins. By stabilizing the pH and degradation reactions of fats and proteins, rancid animal and animal part (e.g. rancid meat, rancid meat by-product and rancid animal feed) are avoided.

Besides protecting the protein of animal or animal part being preserved, it is also necessary to inhibit decomposition of fatty constituents of animal or animal part (e.g. meat, meat by-product and animal feed). This is achieved by adding preservative which serves as potable anti-oxidant to the stabilizer. As anti-oxidant, the preservative inhibits oxidation and, therefore, degradation of fatty acids. The amount of the preservative is correlated to the amount of fat in animal or animal part, so that the amount of preservative will not exceed the limits allowed for the use to which animal or animal part will be put. The range of protein to preservative (protein:preservative) ratios and fat to preservative (fat:preservative) ratios suitable for use in the present invention can vary widely. Generally, a more viscous, acid-stabilized animal or animal part results when ratios in a lower end of a selected range are used and vice versa.

The present invention also relates to methods of stabilizing fats and proteins in acidic pH environments. A chemical product having magnesium oxide, magnesium hydroxide or both are applied as preservative for animal or animal part containing fats, proteins or both. Relatively long-term stability of fats and proteins in acidic pH environments is achieved by promoting chemical reactions between magnesium oxide (in the preservative) and water. Magnesium oxide hydrolyzes to magnesium hydroxide upon contact with water, thus forming hydroxyl groups. Magnesium oxide, magnesium hydroxide or both are applied in an amount sufficient to neutralize acids existing in the proteins during degradation reactions of proteins and to neutralize acids existing in the fats during degradation reactions of fats, resulting in achievement of a relative stability in the proteins and fats.

The method of application of the preservative has generally two stages: a stabilization stage, followed by a recovery stage. In the stabilization stage, animal or animal part (selected from the group consisting of meat, meat by-product, blood, blood product or animal feed) containing fats, proteins or both is contacted with, mixed with or immersed in the preservative which acts as a "stabilizer". Using a slurry metering pump, the preservative can be relatively easily added to the animal or animal part. The preservative may be fed directly from a shipping or storage container using an appropriate metering pump. This stabilization stage may be effected at room temperature with the complete animal or with animal part of any size. It is possible to protect the whole animal or just a part of the animal (e.g. carcass versus meat, blood, viscera etc.). The objective of the stabilization stage is to rapidly change the pH of animal or animal part by immersing or mixing animal or animal part in an alkaline solution (i.e. the solution formed by the preservative and water), resulting in a bactericidal and fungicidal effect. The pH adjustment of animal or animal part is facilitated by two characteristics of the stabilized animal or animal part. First, opening of intercellular spaces allows recovery liquid to penetrate to the interior of the animal or animal part, insuring a rapid and adequate concentration of the hydroxyl ion into the cells of the animal or animal part. Second, the cells are dehydrated when they are submitted to the stabilizing solution since the stabilizing solution is hypertonic. The dehydrated condition speeds penetration of the hydroxyl ions into the cells of the animal or animal part. The bactericidal and fungicidal effects are obtained because most bacteria and fungi found in such cases are active only at a pH which is neutral, slightly acid or slightly alkaline. When the bacteria or fungi are subjected to a sudden and large change in pH, first toward acidity and then toward alkalinity (or vice versa) they do not survive.

The preservative is mixed with water, thus forming hydroxyl groups. The solution is diluted as desired. In accordance with the method of the present invention, animal or animal part containing fats or proteins or both to be treated is prepared, either for use or for storage, such as by freezing. The type of preparation of animal or animal part depends upon the nature of animal or animal part and whether it is to be used immediately or stored. After animal or animal part is prepared as desired, animal or animal part is contacted with the preservative in a manner which allows a substantial portion of the surface of animal or animal part to be contacted with the preservative. The preservative, upon being combined with water to form an alkaline solution, may be poured, sprinkled or sprayed over animal or animal part. The components of the preservative must be thoroughly mixed together before application to animal or animal part. In accordance with the present invention, animal or animal part may be treated by pouring the preservative on a moist exposed surface or by spraying an exposed surface with a solution of the preservative. A solution of the preservative may be injected into arteries or veins of animal or animal part. To permit distribution of the preservative during grinding throughout a ground meat, meat by-product or animal feed, the preservative may be applied to an exposed surface of the ground meat, meat by-product or animal feed or added to the meat, meat by-product or animal feed before or during grinding. Then, animal or animal part and the preservative are gently folded, or tossed together or allow the bits of prepared animal or animal part to be substantially coated with the preservative. Alternately, it may be preferred to soak animal or animal part in the preservative solution in a bowl or a sink.

The time for which animal or animal part is immersed will vary according to, among other factors, the size of animal or animal part, the nature of covering of animal or animal part, the temperature at which the process of stabilization is carried out, the concentration in which the "stabilizing" preservative or "stabilizer" is applied. Treated animal or animal part is allowed to soak for a period of time sufficient to permit the composition to cause treated animal or animal part to remain fresh longer than treated animal or animal part would have lasted if it were untreated. After the reaction period, the excess preservative is removed. Usually, removal is carried out by simply allowing animal or animal part to drain in a colander or strainer or the like. The excess preservative recovered from animal or animal part may be reused for a similar animal or animal part.

The stabilization stage is very simple. It only requires a vessel for the stabilizing preservative. The shape and size of the vessel may vary, but it is necessary that animal or animal part be totally immersed in solution for the entire time to ensure its protection. The stabilization stage is preferably effected at a site where animal or animal part can be protected against the sun, dust, insects and animals.

After the stabilization stage, animal or animal part can be handled and stored in bags, boxes or other packages which can be sealed to avoid dehydration of their contents or otherwise suitably wrapped. After the excess preservative has been removed from treated animal or animal part, animal or animal part may then be stored, such as by freezing or refrigeration, until it is to be used or consumed. For storage, treated animal or animal part is preferably placed in a separate covered and sealed container or otherwise suitably wrapped. The particular storage method will depend on type of animal or animal part.

Numerous tests have been performed on the method of application of the preservative. There are a variety of conditions sufficient to promote chemical reaction between fats or proteins and the preservative, depending upon the nature of fats, proteins and the preservative used in the method of application. Various energy sources, including heat, mechanical energy or microwave energy, may be used either alone or in combination with one another to promote chemical reaction between fats or proteins and the preservative. Optimizing the method of application of the preservative has been a common goal of all the tests. The results of some of the tests run for enhancing the method of application of the preservative follow:

EXAMPLE 1

Add 22 gm of the preservative to 80 ml of clean water while mixing vigorously by hand with a mechanical mixer or with a magnetic stirrer.

A stock solution of 20 weight percent concentration is formed.

Addition of the preservative in excess of 22 gm of the preservative to 80 ml of clean water (i.e. over 20 weight percent concentration) led to water boiling and splashing of the solution (due to hydrolysis reaction).

EXAMPLE 2

Four five-gallon buckets were filled with float from an air flotation recovery unit at a chicken and chicken part production facility. Each bucket contained 30 lbs of chicken and chicken part containing fats and proteins. The pH values of chicken and chicken part containing fats and proteins were:

| TIME | CONTROL (pH) | Amount of Magnesium Oxide (MgO) | | |
|---|---|---|---|---|
| | | 2000 ppm (pH) | 2500 ppm (pH) | 3000 ppm (pH) |
| 0 | 5.6 | 8.3 | 8.7 | 8.7 |
| 1:30 p.m. | 6.3 | 6.8 | 7.5 | 8.7 |
| 7:30 p.m. | 5.7 | 7.3 | 7.7 | 8.5 |
| 10:30 p.m. | 4.8 | 7.1 | 7.0 | 7.7 |
| 1:30 a.m. | 4.6 | 6.9 | 7.2 | 7.6 |
| 4:30 a.m. | 4.3 | 6.8 | 7.1 | 7.7 |
| 7:30 a.m. | 4.1 | 6.9 | 6.8 | 6.8 |
| 10:30 a.m. | 4.1 | 6.9 | 6.9 | 7.2 |
| 1:30 p.m. | 4.1 | 6.8 | 7.0 | 7.0 |

Temperature of operation was approximately 90° F. Measurements are started upon addition of magnesium oxide. The first set of measurements, that are listed as "CONTROL" data, is made without use of magnesium oxide.

As is demonstrated by the data, the larger is the ratio of preservative (i.e. magnesium oxide) to animal or animal part containing fats and proteins, the longer is the duration of stability of fats and proteins in animal or animal part and the longer it takes to reach the acidic pH stage of animal or animal part.

EXAMPLE 3

Four five-gallon buckets were filled with float from an air flotation recovery unit at a chicken and chicken part production facility. Each bucket contained 30 lbs of chicken and chicken part containing fats and proteins. The pH values of chicken and chicken part containing fats and proteins were:

| | | Amount of Magnesium Oxide (MgO) | | |
|---|---|---|---|---|
| TIME | CONTROL (pH) | 1500 ppm (pH) | 2000 ppm (pH) | 2500 ppm (pH) |
| 9:30 a.m. | 7.4 | 9.3 | 9.3 | 9.3 |
| 12:30 p.m. | 6.7 | 9.4 | 9.3 | 8.0 |
| 3:30 p.m. | 5.9 | 7.8 | 7.6 | 7.1 |
| 6:30 p.m. | 5.6 | 6.5 | 7.4 | 7.0 |
| 9:30 p.m. | 5.5 | 6.7 | 7.2 | 6.6 |
| 12:30 a.m. | 5.5 | 6.5 | 6.6 | 5.6 |
| 3:30 a.m. | 5.4 | 6.4 | 6.6 | 6.4 |
| 6:30 a.m. | 5.3 | 6.7 | 6.7 | 6.6 |
| 9:30 a.m. | 5.3 | 6.4 | 6.7 | 6.6 |

Temperature of operation was approximately 90° F. Measurements are started upon addition of magnesium oxide. The first set of measurements, that are listed as "CONTROL" data, is made without use of magnesium oxide.

As can be seen, when preservative is used with animal and animal part containing fats and proteins, a relatively longer term of stability in pH conditions of animal and animal part exists. Without the use of preservative, acidic conditions of animal and animal part are almost immediately started. When preservative is used, acidic conditions of animal and animal part can be delayed for several hours, even for a day. (Please refer to data from use of 2000 ppm of preservative.)

EXAMPLE 4

Two quarts of chicken blood were mixed with magnesium oxide. Tests were run at room temperature approximately 80° F. The following results were obtained:

| TIME | CONTROL (pH) | Amount of Magnesium Oxide (MgO) 2500 ppm (pH) |
|---|---|---|
| 6:30 p.m. | 6.8 | 9.3 |
| 9:30 p.m. | 5.9 | 8.4 |
| 12:00 a.m. | 5.4 | 7.6 |
| 3:00 a.m. | 5.0 | 7.1 |
| 6:00 a.m. | 4.8 | 6.8 |
| 6:00 p.m. | 4.6 | 6.7 |

In confirmation, when preservative is used with animal and animal part, a relatively longer term of stability in pH conditions exists than without use of preservative. Without the use of preservative acidic conditions in animal and animal part are almost immediately started. When preservative is used, acidic conditions in animal and animal part can be delayed for almost 12 hours in this case. Without using preservative, animal and animal part itself are acidic originally and become more acidic upon passage of time.

The unique chemical product has numerous advantages over existing similar products and systems. Significant cost savings are provided in controlling pH by using the preservative. The preservative is a self-buffering system that provides high pH control. In a preferred embodiment, the preservative of the present invention is twice as effective as lime, twice as effective as caustic and three times more effective than soda ash in neutralizing acids. By eliminating lime addition, calcium carbonate loading from lime addition is also eliminated. Therefore, the preservative is more cost effective in pH control than either caustic, lime or soda ash.

The preservative has been proven to be much safer in other applications, for example with bacterial systems, than caustic, lime or soda ash are. By avoiding pH swings, harmful effects on bacterial populations in secondary treatment systems, such as industrial and municipal aeration basins and wastewater treatment lagoons, have been prevented. Although the preservative has been used in aeration basins and in wastewater lagoons as a pH stabilizer, the preservative has never been used, so far as applicant is aware, as a pH stabilizer in animal or animal part containing fats, proteins or both as contemplated by the present invention.

Certain objects are set forth above and made apparent from the foregoing description and examples. However, since certain changes may be made in the above description and examples without departing from the scope of the invention, it is intended that all matters contained in the foregoing description and examples shall be interpreted as illustrative only of the principles of the invention and not in a limiting sense. With respect to the above description and examples then, it is to be realized that any descriptions and examples deemed readily apparent and obvious to one skilled in the art and all equivalent relationships to those stated in the examples and described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A method for preserving edible animal parts containing fats, proteins or both, said method comprising:
   (a) applying to the edible animal parts in a stabilization stage a chemical product, which comprises magnesium oxide, magnesium hydroxide or both, in concentrations ranging from approximately 500 ppm to approximately 5000 ppm to neutralize acids during degradation reactions of proteins, fats or both; such that the pH of the edible animal parts is held at or above approximately 6.0 for extended periods of time and such that production of acids, sulfides and ammonia in the edible animal parts is delayed
   (b) removing in a recovery stage excess chemical product from the edible animal parts.

2. The method according to claim 1, said method further comprising adding water to the edible animal parts to hydrolyze magnesium oxide to magnesium hydroxide, with magnesium hydroxide serving as pH stabilizer in the edible animal parts.

3. The method according to claim 1, wherein magnesium oxide, magnesium hydroxide or both are combined with an anti-oxidant.

4. The method according to claim 3, wherein the anti-oxidant is Vitamin E (Tocopheryl Acetate).

5. The method according to claim 1, wherein magnesium oxide, magnesium hydroxide or both are combined with sodium hydroxide.

6. The method according to claim 1, wherein magnesium oxide, magnesium hydroxide or both are combined with potassium hydroxide.

7. The method according to claim 1, wherein magnesium oxide, magnesium hydroxide or both are combined with calcium oxide.

8. The method according to claim 1, wherein magnesium oxide, magnesium hydroxide or both are combined with calcium hydroxide.

9. The method according to claim 1, wherein magnesium oxide, magnesium hydroxide or both are combined with sodium bicarbonate.

10. The method according to claim 1, said method further comprising:

(a) combining the chemical product with water to form an alkaline solution; and (b) immersing or mixing the edible animal parts in the alkaline solution.

11. The method according to claim 1, wherein the chemical product, upon being combined with water to form an alkaline solution, is poured, sprinkled or sprayed over the edible animal parts.

12. The method according to claim 1, wherein the chemical product is applied to a surface of a piece of meat, meat by-product or animal feed or added to the meat, meat by-product or animal feed, respectively, before or during grinding to permit distribution of the chemical product during grinding throughout the ground piece.

13. A method for preserving animal or animal parts containing fats, proteins or both, said method comprising:

(a) applying in a stabilization stage a chemical product, which is composed of magnesium oxide, magnesium hydroxide or both to animal or animal parts; and (b) removing in a recovery stage excess chemical product from animal or animal parts;

wherein the chemical product, upon being dissolved in water, is injected into arteries or veins of animal or animal parts.

14. A method for preserving edible animal parts containing fats, proteins or both, said method comprising:

applying to edible animal parts in a stabilization stage a chemical product, which comprises magnesium oxide, magnesium hydroxide or both, in concentration ranging from approximately 500 ppm to approximately 5000 pmm to neutralize acids during degradation reactions of proteins, fats or both such that the pH of the edible parts is held at or above approximately 6.0 for extended periods of time, and such that production of acids, sulfides and ammonia in the edible animal parts is delayed.

* * * * *

UNITED STATES PATENT AND TRADEMARK OFFICE
CERTIFICATE OF CORRECTION

PATENT NO   :   6,066,349
DATED       :   May 23, 2000
INVENTOR(S) :   Richard Alan Haase It is certified that error appears in the above-identified patent and that said Letters Patent are hereby corrected as shown below:

Column 2, line 1:    cancel "carrying" (second occurence).

Column 2, line 34:   change "galactomanman" to --galactmannan--.

Column 12, line 15:  change "concentration" to --concentrations--.

Column 12, line 17:  change "pmm" to --ppm--.

Column 12, line 18:  after "edible" insert --animal--.

Signed and Sealed this

Third Day of April, 2001

Attest:

NICHOLAS P. GODICI

Attesting Officer     Acting Director of the United States Patent and Trademark Office